(No Model.)
B. C. HICKS.
VELOCIPEDE.
No. 557,388. Patented Mar. 31, 1896.
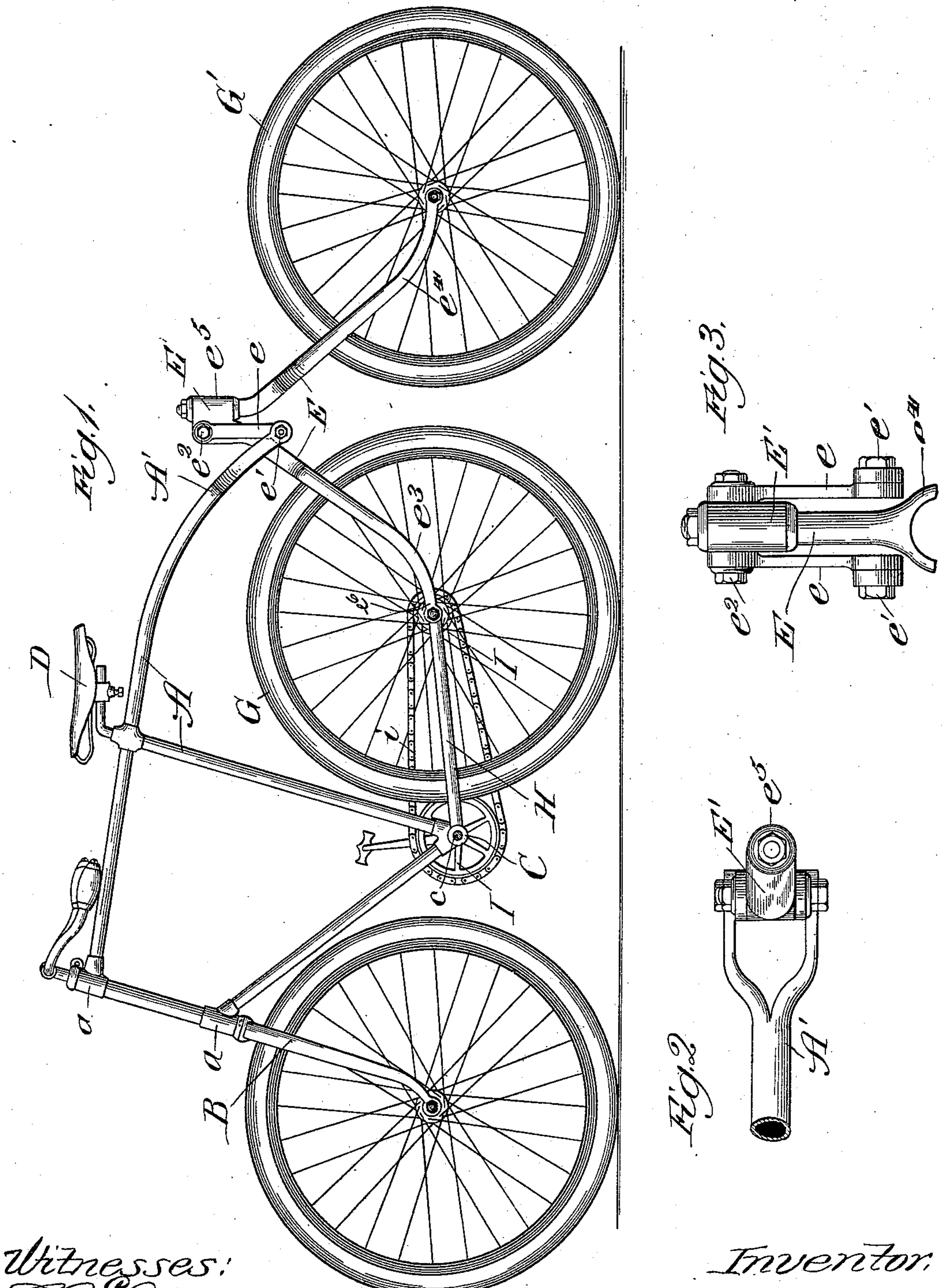
Witnesses:
Chas. E. Gaylord,
Lute J. Alter.
Inventor:
Bohn C. Hicks,
By Banning & Banning & Sheridan,
Att'ys.
ANDREW B. GRAHAM, PHOTO-LITHO. WASHINGTON, D.C.

UNITED STATES PATENT OFFICE.

BOHN C. HICKS, OF CHICAGO, ILLINOIS, ASSIGNOR TO THE REX CYCLE COMPANY OF CHICAGO, OF SAME PLACE.

VELOCIPEDE.

SPECIFICATION forming part of Letters Patent No. 557,388, dated March 31, 1896.

Application filed November 18, 1895. Serial No. 569,321. (No model.)

*To all whom it may concern:*

Be it known that I, BOHN C. HICKS, a citizen of the United States, residing at Chicago, Illinois, have invented certain new and useful Improvements in Velocipedes, of which the following is a specification.

The object of my invention is to provide a simple, economical, and efficient velocipede particularly adapted to absorb or minimize the shocks incident to riding over obstructions, and it is intended to be an improvement on the velocipede described and claimed in a patent granted to me the 22d day of October, 1895, No. 548,366.

The mechanism shown and described in this application is not claimed broadly herein, as the broad idea is claimed in the pending application filed the 27th day of August, A. D. 1895, Serial No. 560,654.

The invention consists in the features, combinations, and details of construction hereinafter described and claimed.

In the accompanying drawings, Figure 1 is a side elevation of a bicycle fitted with my improvement; Fig. 2, an enlarged plan view of a portion of the machine, showing the mechanism for joining the main and supplemental frame portions together, looking at it from the top, and Fig. 3 a front elevation of the mechanism shown in Fig. 2.

In the use of vehicles, particularly velocipedes and bicycles, it is well known that they are subjected to shocks in riding over obstructions, which tends to injure the parts and render the riding of the vehicle more or less disagreeable and injurious. The principal object of my invention, therefore, is to obviate these objections and provide a bicycle that will permit of riding over ordinary obstructions without tending to injure either wheel or rider.

In setting forth my improvement I have only thought it necessary to show it in connection with one form of vehicle—namely, a bicycle of the rear-driver safety type. It will be understood, however, that I intend to use it with all classes of vehicles to which it is applicable, making such slight mechanical changes as may be deemed necessary or expedient, without departing from the spirit of the invention.

In constructing a bicycle which is fitted with my improvement I provide a main frame A of the desired shape, size, and strength, and which, as is shown in Fig. 1, is provided with the usual front fork B, pivoted thereto at $a$, front steering-wheel $b$, bearing-bracket C, and saddle D.

The main frame is extended to the rear of the saddle, as at A, for the purpose of attaching other parts, as hereinafter set forth. To support the rear portion of the main frame in a flexible manner and permit the wheel to be driven in an economical manner an auxiliary frame E is provided. This auxiliary frame is preferably of an inverted-V shape and is flexibly connected with the main frame by means of a pair of connecting-links $e$ $e$. These links are pivotally connected to the frame portions by means of the headed shoulder-screws $e'$ $e'$ at their lower ends and the bolts $e^2$ at the upper end. An inspection of the drawings will show that the rear end of the main frame is suspended from the auxiliary frame and that such auxiliary frame is permitted to vary its relative position with regard to the main frame.

The auxiliary frame, as above stated, is of an inverted-V shape, and consists in a head portion E', a front depending leg $e^3$, and a rear depending leg $e^4$. The front depending leg is rigidly secured to the head portion and is bifurcated to receive a driving-wheel G. The rear depending leg is also bifurcated to receive a supplemental wheel G', but is pivotally secured to the head portion at $e^5$, so that the supplemental wheel may easily "track" with the driver. The lower portion of the front depending leg, as at $e^6$, which forms the bearings for the driving-wheel, is connected with the bearing-bracket by means of a pair of links H, one at each side of the wheel. These links are pivotally secured to such portion, so as to form a flexible connection between the same, but which acts to always preserve a uniform distance between the axle of the driving-wheel and the crank-shaft $c$. The usual sprockets I I' and chain $i$ are provided for the purpose of transmitting the power from the crank-shaft to the driving-wheel.

From the above description and an inspection of the drawings it will be seen that I have provided a flexible-bar connection between the rear end of the main frame and the auxiliary frame, and what might be termed a "compound" flexible connection between the rear end of the main frame through the auxiliary frame to the crank-shaft, so that the parts are practically rigid laterally, but permit of a flexible movement vertically.

I claim—

1. In a vehicle, the combination of a main frame carrying a part of the supporting-wheels, an inverted-V-shaped auxiliary frame connected with the main frame at or near the rear end and provided with at least two wheels arranged longitudinally with respect to each other, a pair of links connecting the rear end of the main frame with the auxiliary frame, and a second pair of links flexibly connecting the bearing-bracket of the main frame with the lower portion of the front leg of the auxiliary frame, to preserve a desired distance between such points and form through the auxiliary frame a compound flexible connection, substantially as described.

2. In a vehicle, the combination of a main frame provided with a front steering-wheel, an auxiliary frame flexibly connected with the main frame at or near its rear portion consisting of at least two depending members the front depending member being rigid and provided with a driving-wheel the rear depending member being pivotally connected to the auxiliary frame and provided with a supplemental wheel, a pair of link-bars flexibly connecting the rear portion of the main frame with the auxiliary frame, and a second pair of links connecting the bearing-bracket of the main frame with the bearing portion of the lower portion of the front depending leg of the auxiliary frame, substantially as described.

BOHN C. HICKS.

Witnesses:
THOMAS F. SHERIDAN,
THOMAS B. MCGREGOR.